United States Patent Office 3,511,840
Patented May 12, 1970

3,511,840
POLYFUNCTIONAL PIPERAZINE AMIDES
Giuliana C. Tesoro, Dobbs Ferry, N.Y., assignor to J. P.
Stevens & Co., Inc., New York, N.Y., a corporation
of Delaware
No Drawing. Continuation-in-part of application Ser. No.
301,875, Aug. 13, 1963. This application Feb. 28, 1967,
Ser. No. 619,156
Int. Cl. C07d 51/70
U.S. Cl. 260—268                6 Claims

---

ABSTRACT OF THE DISCLOSURE

Polyfunctional amide compounds having the formula:

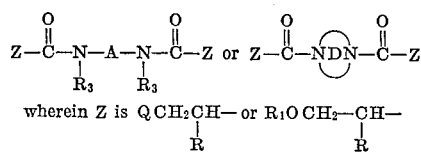

wherein Z is $QCH_2CH-$ or $R_1OCH_2-CH-$
                    $\;\;\;\;\;\;\;\;\;\;\;\;|$                        $\;\;\;\;\;\;\;\;\;\;\;\;\;\;|$
                    $\;\;\;\;\;\;\;\;\;\;\;\;R$                        $\;\;\;\;\;\;\;\;\;\;\;\;\;\;R$ R is H or lower alkyl,
$R_1$ is lower alkyl,
$R_3$ is lower alkyl,
A is aliphatic or cyclo-aliphatic, and
Q is the radical corresponding to an acid which has a dissociation constant in water between $5 \times 10^{-2}$ and $5 \times 10^{-6}$, or the radical corresponding to a tertiary ammonium cation, and

is the residue of amines of the structure

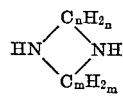

wherein $n$ and $m$ are integers from 1 to 4.

The compounds may be employed as crosslinking agents for polymers.

---

This application is a continuation-in-part of copending application Ser. No. 301,875 filed Aug. 13, 1963, now abandoned.

The present invention relates to novel polyfunctional amide compounds which can be employed as crosslinking agents for polymers. Characterized by the presence of at least two functional groups, the novel polyfunctional compounds of the present invention are capable of reacting with the active hydrogen atoms of various polymeric materials.

Accordingly, it is an object of the present invention to provide a new and novel class of polyfunctional amide compounds which contain at least two particular terminal groups capable of acting as reactive sites.

It is a further object of the present invention to provide methods for making polyfunctional amide compounds.

The polyfunctional nitrogen-containing compounds of this invention contain at least two terminal groups represented by the structural formula:

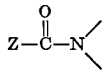

wherein Z is an organic reactive group as defined hereinafter.

Included among the compounds of the present invention are those which contain at least two of the same terminal groups represented by the structure I or II:

I
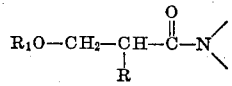

in which R is selected from the group consisting of hydrogen and alkyl and preferably a lower alkyl, i.e. from 1 to 5 carbon atoms, $R_1$ is lower alkyl, and II
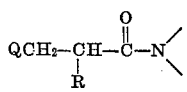

in which R may be H or alkyl, and
Q is the radical corresponding to an acid which has a dissociation constant in water between $5 \times 10^{-2}$ and $5 \times 10^{-6}$, or the radical corresponding to a tertiary ammonium cation. The expression "tertiary ammonium cation" means the cation of the substituted ammonium salt of a tertiary amine and an acid.

Compounds which come within the scope of this invention containing terminal functional groupings represented by the Formulae I and II which are derived from amines are represented by the structural formula:

III
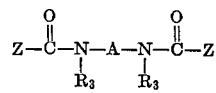

wherein Z, the organic reactive group is a member selected from the group consisting of

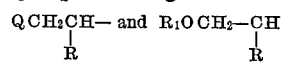

wherein R is selected from the group consisting of hydrogen and lower alkyl, i.e. 1 to 5 carbon atoms, and $R_1$ is lower alkyl,
Q is the radical corresponding to an acid which has a dissociation constant in water between $5 \times 10^{-2}$ and $5 \times 10^{-6}$, or the radical corresponding to a tertiary ammonium cation,
$R_3$ is lower alkyl, i.e. from 1 to about 5 carbon atoms, and
A, when derived from acyclic bis-secondary amines is a divalent aliphatic organic radical, including the alkylene groups and alkenylene groups of the formulae:

$$-C_aH_{2a}- \text{ and } -C_aH_{(2a-2)}-$$

respectively, where $a$ is an integer of from 2 to 10. A can also be a cyclo-aliphatic group, i.e.

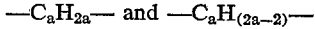

where $b$ and $c$ are integers and have a value of 1 or 2.

Compounds of this invention derived from heterocyclic bis-secondary diamines and where the terminal functional groupings are linked by a divalent organic group, are represented by the generic structural formula:

IV
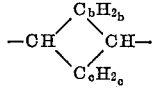

wherein Z has the same meaning as above, and the symbol

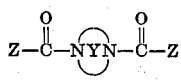

as used herein represents the residue of a heterocyclic bis-secondary amine, viz.

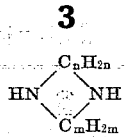

It is to be noted that the compounds coming within the scope of Formula III contain nitrogen atoms which are free of hydrogen atoms.

Examples of suitable acyclic bis-secondary diamines, both saturated and unsaturated, which can be employed to produce the novel compounds of the present invention of Formula III above may be represented by the generic formulae:

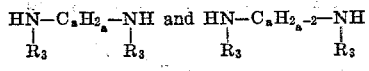

in which $R_3$ is a lower alkyl group, and $a$ is an integer with a value of from 2 to 10.

Aminoalkyl cyclohexanes such as 1,4-bis(aminomethyl)-cyclohexane represented by the structural formula:

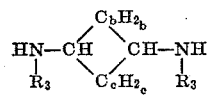

wherein $R_3$ is lower alkyl and $b$ and $c$ are integers with a value of 1 to 2, may also be employed to form compounds of Formula III.

Coming within the scope of the suitable heterocyclic diamines which may be employed to produce the novel compounds of this invention of Formula IV above are C-lower alkyl-substituted piperazines and unsubstituted piperazines, pyrazolidines, and the like, which may be represented by the structural formula:

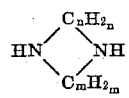

in which $n$ and $m$ each have a value of 1 to 4.

The radical Q which forms a part of the terminal grouping of Formula II above is the radical corresponding to an acid which has a dissociation constant in water between $5 \times 10^{-2}$ and $5 \times 10^{-6}$, or the radical corresponding to a tertiary ammonium cation. Included within the scope of this definition are polar residues derived from weakly nucleophilic reagents. Illustrative of but not limiting the polar residues are the following:

$$-OSO_3M$$
$$-SSO_3M$$
$$-OCOCH_3$$
$$-OCOH$$
$$-OCOC_2H_5$$
$$[-NC_5H_5]X^-$$

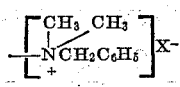

wherein M is an alkali metal, e.g., Na, K, Li, or ammonium, and X is a monovalent anion such has halogen, e.g., Cl⁻.

The compounds of the present invention can be prepared from available raw materials in an economical manner. Because of their excellent water solubility and high reactivity, they are particularly suitable as crosslinking agents for polymeric materials containing active hydrogen atoms, as determined by the Zerewitinov method. For example, these compounds can react readily with cellulose in the form of solution, fiber, yarn and fabric and can therefore be used to impart desirable properties to the cellulosic textile and non-textile materials. Wool and keratin fibers are other types of fibrous polymers containing active hydrogen atoms that can be treated in accordance with the present invention.

Specific examples of compounds coming within the scope of the above formulae include but are not limited to:

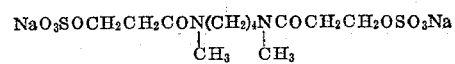

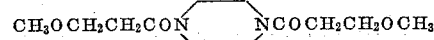

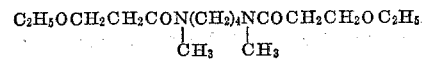

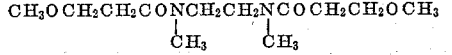

The compounds of the present invention can be prepared by several means and the choice of the specific process which is employed will depend on the general chemical properties of the specific structures which are desired.

Employing a bis-secondary cyclic amine, an acylation reaction can be carried out with an appropriate acid chloride in the presence of an acid acceptor. This method of preparation is shown in Equation 1 below which represents the acylation of piperazine with methoxypropionyl chloride.

(1)

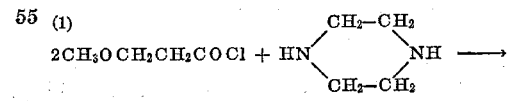

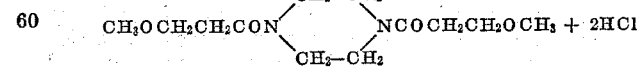

In a similar manner other amines and other acid chlorides can also be employed in the preparation of correspondingly different final products.

In addition to the acylation-type reactions illustrated above, an aminolysis reaction can be carried out using the esters of a suitable structure. This reaction is shown in Equation 2 below wherein N,N¹-dimethyl-butylenediamine-1,4 is used as an example of an acyclic bis-secondary amine and beta-ethoxyethyl propionate is used as an example of a suitable ester.

(2)

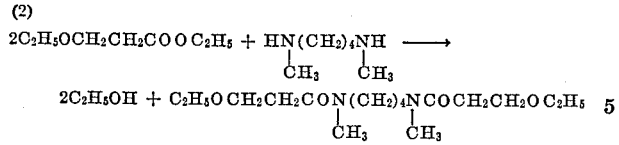

Unsaturated compounrs can be employed to prepare the saturated compounds which correspond to Formula I. This is carried out by the addition of alcohols as shown in Equation 3.

(3)

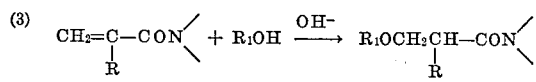

A suitable procedure for the preparation of hydroxy-terminated compounds is the reaction of an ester, such as acetate with ammonia or amides as shown schematically in Equation 4.

(4)

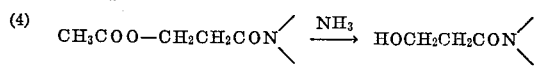

The compounds of the Formula II can be obtained by reaction between an acid halide or ester with a suitable diamine. These compounds can be prepared from the corresponding beta-halopropionamide compounds as well as other procedures.

The compounds of Formula II can be prepared by various synthetic procedures depending on the particular reagent chosen. Illustrative of such procedures are Equations 5 through 8.

(5)

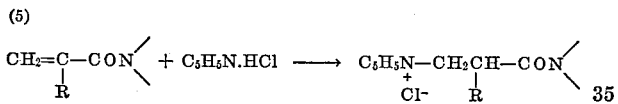

(6)

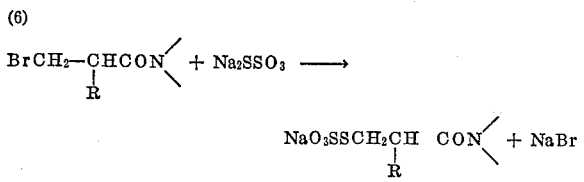

(7)

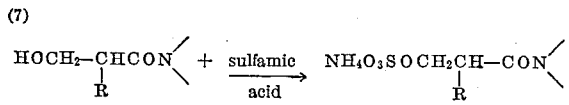

(8)

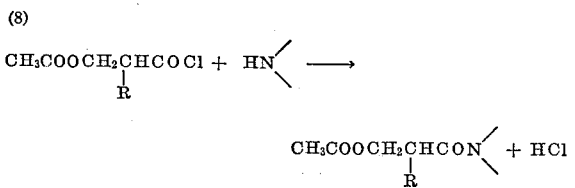

In general, the reaction conditions employed in the foregoing preparatory procedures will vary considerably depending on the nature of the starting materials. For example, reactions involving an acid halide in Equations 1 and 8 require the use of an acid acceptor to neutralize the acid which is liberated in the course of the reaction. This acid acceptor can be an organic or inorganic base. When an ester is employed as the starting material as illustrated in Equation 2, it is preferable to remove the by-product alcohol which is formed from the reaction mixture by distillation or other suitable means. Any of the reactions described above can be carried out in the presence of a solvent if so desired. In those cases where this procedure is preferred, the solvent should be an inert one. Moderate temperatures are usually employed in the preparation of the unsaturated compounds since these tend to form polymeric by-products if they are subjected to elevated temperatures.

The following examples will serve to illustrate the invention but are not considered as limiting the invention in any way.

EXAMPLE I 1,4-bis(3-acetoxypropionyl) piperazine

A mixture of piperazine (51 g., 0.59 m.), potassium bicarbonate (145 g., 1.45 m.) and water (325 ml.) was cooled to 5° and treated with 3-acetoxypropionyl chloride (199 g., 1.32 m.) added dropwise while maintaining the internal temperature at 4–7°. The addition was complete in 1.5 hours, and the reaction mixture was then permitted to warm to room temperature with stirring.

Water (500 ml.) and chloroform (250 ml.) were added to the reaction mixture. The separated aqueous layer was extracted thoroughly with chloroform, and the organic solvent dried and removed to give crude 1,4-bis(3-acetoxypropionyl) piperazine, (183 g., 90% yield).

Recrystallization from benzene-hexane gave an analytical sample, M.P. 136–138°.

*Analysis.*—Calculated (percent): C, 53.5; H, 7.01; N, 8.92. Found (percent): C, 53.24; H, 7.48; N, 7.98.

The infrared spectrum (CHCl₃ solution) showed maxima at 5.78 (acetate carbonyl), 6.10 (amide carbonyl), 7.32 (acetate C—CH₃) and 9.65µ (C—O).

Note: In the foregoing and subsequent examples, all reference to temperature is in degrees C., except as otherwise designated.

EXAMPLE II 1,4-bis(3-methoxypropionyl) piperazine

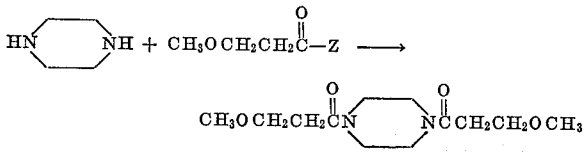

Where Z=—Cl or —OCH₃

Method A: (Z=Cl)

3-methoxypropionyl chloride (54 g.) and hydroquinone (0.1 g.) were dissolved in benzene (160 g.) and the solution chilled to 0° C. While the temperature was maintained at or below 0°, a solution of piperazine (17.2 g.) and triethylamine (40 g.) in chloroform (120 g.) was added in 20 minutes. The mixture was stirred at 0° for 30 minutes, and filtered to remove triethylamine hydrochloride (49 g.).

The filtrate was evaporated in vacuum to a volume of 180 g., decolorized with carbon and treated with hexane (130 g.). The solution was chilled overnight, then filtered to give 1,4-bis(3-methoxypropionyl)-piperazine (30 g., 58% yield) as colorless prisms, M.P. 74–76°. The compound is soluble in an equal weight of water.

A chloroform solution exhibited infrared absorption maxima at 6.12 (amide carbonyl) and 8.95 (methoxyl) µ.

Method B: (Z=OCH₃)

Methyl 3-methoxypropionate (532 g.) and piperazine (129 g.) were combined and heated during 8 hours at 60–140°, while methanol (76 g.) was collected by distillation. The mixture was placed under vacuum and excess ester (210 g.) removed by distillation, B.P. 54–56° at 16–19 mm., leaving the desired product as a residue (365 g.).

A portion of the residue (217 g.) was fractionally distilled and the fraction (102 g.) boiling at 190–195° at 0.4–0.5 mm. was collected. This fraction (26% yield) solidified to a soft solid, M.P. 47–51°, whose infrared absorption spectrum in chloroform solution showed it to be the same product as that produced by Method A; maxima were found at 6.13 (amide carbonyl) and 8.95 (methoxyl)µ.

EXAMPLE III

N,N¹-bis(3-methoxypropionyl)-N,N¹-dimethyl-1,2-ethylenediamine

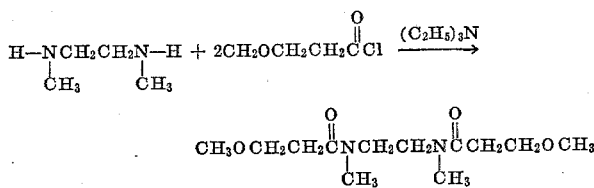

A solution of N,N¹-dimethyl-1,2-ethylenediamine (88 g.) and triethylamine (202 g.) in chloroform (580 g.) was added at 0° to a chilled solution of 3-methoxypropionyl chloride (270 g.) and hydroquinone (0.5 g.) in benzene (770 g.). The reaction mixture was permitted to warm to room temperature and stand overnight.

Triethylamine hydrochloride (249 g., expected weight 275 g.) was removed by filtration, and the solvents evaporated in vacuum to give crude N,N¹-bis(3-methoxypropionyl)-N,N¹-dimethyl-1,2-ethylenediamine (282 g.).

A portion of this crude material was distilled to give the pure product, B.P. 166–174° (0.3–0.5 mm.), in 59% yield.

*Analysis.*—Calculated (percent): C, 55.35; H, 9.29; N, 10.76; OCH₃, 23.84. Found (percent): C, 55.38; H, 9.33; N, 10.77; OCH₃, 21.86.

A chloroform solution exhibited infrared absorption maxima at 6.12 (amide carbonyl) and 8.95μ (methoxyl).

EXAMPLE IV

N,N'-bis[3-(sodium sulfato)propionyl]piperazine

N,N'-bis[3-hydroxypropionyl]piperazine (128 parts) was sulfated by heating with sulfamic acid (144 parts) and urea (10.8 parts) to 130–140°. The reaction was complete in 1.5 hours, when base titration indicated only 0.44% sulfamic acid remained. An aqueous solution of the ammonium salt was passed through an ion exchange column prepared with Rohm & Haas Co. Amberlite IR–120H (—SO₃H form) or an equivalent resin. The effluent solution was cooled to 5–10° C., and carefully neutralized with sodium carbonate to pH 6, giving a solution of the desired sodium salt.

The anhydrous salt was isolated by evaporation of the aqueous solution and extraction of the residue with hot ethanol. The pure salt was obtained as a white powder.

*Analysis.*—Calculated (percent): C, 27.65; H, 4.34; N, 7.07. Found (percent): C, 26.91; H, 4.73; N, 6.73.

The foregoing procedure produces compounds of the structural formula:

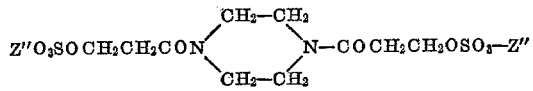

wherein Z″ is H (acid form), NH₄ (ammonium salt) and Na (sodium salt).

EXAMPLE V 1,4-bis(3-hydroxypropionyl)piperazine 1,4-bis(3-acetoxypropionyl)piperazine (158 g., 0.503 m.) was suspended in water (300 ml.) and treated with conc. ammonium hydroxide (29%, 144 g., 1.2 m.). The combined mixture was diluted with ethanol (300 ml.) and stirred for 100 hours.

The solvents were removed in vacuum to leave a solid residue (181 g.) which was taken up in hot chloroform and permitted to crystallize. 1,4-bis(3-hydroxypropionyl)piperazine, M.P. 123–127° (72.3 g., 62% yield) was isolated by filtration.

An analytical sample, M.P. 127.5–129° was prepared by two recrystallizations from chloroform/hexane. The identity of the product was confirmed by the lack of depression of a mixed melting point taken with a sample prepared by the action of beta-propiolactone on piperazine.

*Analysis.*—Calculated (percent): C, 52.2; H, 7.82; N, 12.18. Found (percent): C, 52.39; H, 8.00; N, 12.30.

The infrared spectrum (in "Nujol"-refined mineral oil) showed maxima at 2.95 (NH), 6.20 (amide carbonyl), and 9.78μ (C—O).

I claim:
1. Difunctional amide compounds having two identical groups of the structure selected from the group consisting of:

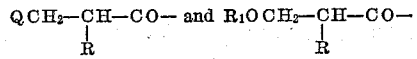

attached to the nitrogen atom of piperazine or C-lower-alkyl substituted piperazine, wherein R is H or lower alkyl,
R₁ is lower alkyl, and
Q is selected from the group consisting of —OSO₃M, —SSO₃M, —OCOCH₃, —OCOH, —OCOC₂H₅,

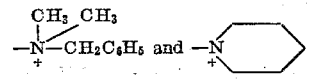

wherein
M is a member selected from the group consisting of Na, K, Li, and ammonium.

2. A method for making a compound of the structure

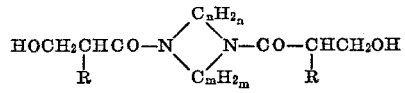

wherein R is H or lower alkyl, and n and m are integers with a value of 1 to 4, comprising reacting

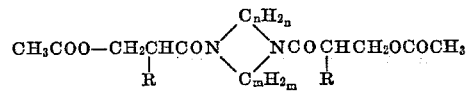

with a solution ammonia.

3. A compound as defined in claim 1 which is

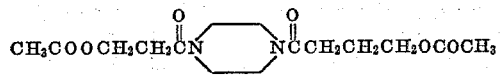

4. A compound as defined in claim 1 which is

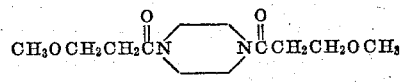

5. A compound as defined in claim 1 which is

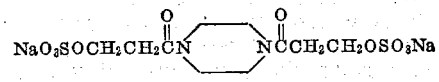

6. A compound as defined in claim 1 which is
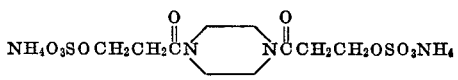
References Cited
UNITED STATES PATENTS
| | | | |
|---|---|---|---|
| 3,147,261 | 9/1964 | Moo et al. | 260—268 |
| 3,196,156 | 7/1965 | Inaba | 260—268 |
| 3,293,253 | 12/1966 | Horrom et al. | 260—268 |
| 3,294,802 | 12/1966 | Skau | 260—268 |
| 3,338,883 | 8/1967 | Tesoro | 8—120 |
OTHER REFERENCES
Chem. Abstr. vol. 63, Col. 7160, abstracting British Pat. 993,596, May 1965.
Feser et al. "Advanced Organic Chemistry," Reinhold 1952, pp. 372–3, 380–81.
DONALD G. DAUS, Primary Examiner
U.S. Cl. X.R.
8—120; 260—239, 239B, 268C, 268S, 310, 561